United States Patent
Tao et al.

(10) Patent No.: US 10,027,165 B2
(45) Date of Patent: Jul. 17, 2018

(54) POWER SUPPLY CIRCUIT WITH SECONDARY SIDE TO PRIMARY SIDE COMMUNICATION

(71) Applicant: FAIRCHILD SEMICONDUCTOR CORPORATION, Sunnyvale, CA (US)

(72) Inventors: Zhibo Tao, Palo Alto, CA (US); Zhao-Jun Wang, San Jose, CA (US); Chih-Hsien Hsieh, Dacun (TW); Li Lin, Zubei (TW)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

(21) Appl. No.: 15/600,565

(22) Filed: May 19, 2017

(65) Prior Publication Data

US 2017/0366044 A1    Dec. 21, 2017

Related U.S. Application Data

(60) Provisional application No. 62/352,226, filed on Jun. 20, 2016.

(51) Int. Cl.
| | |
|---|---|
| H02M 3/335 | (2006.01) |
| H02J 9/06 | (2006.01) |
| H02M 7/487 | (2007.01) |
| H02M 1/42 | (2007.01) |
| H02M 1/00 | (2006.01) |

(52) U.S. Cl.
CPC ........... *H02J 9/062* (2013.01); *H02M 1/4225* (2013.01); *H02M 3/33507* (2013.01); *H02M 3/33523* (2013.01); *H02M 3/33576* (2013.01); *H02M 3/33592* (2013.01); *H02M 7/487* (2013.01); *H02M 2001/0032* (2013.01)

(58) Field of Classification Search
CPC ......... H02M 3/33507; H02M 3/33523; H02M 3/33592
See application file for complete search history.

(56) References Cited

U.S. PATENT DOCUMENTS

| | | | |
|---|---|---|---|
| 9,318,963 B2 | 4/2016 | Yao et al. | |
| 2007/0076449 A1* | 4/2007 | Nakamura | H02M 3/33507 363/21.12 |
| 2011/0096573 A1 | 4/2011 | Zhu et al. | |
| 2013/0235620 A1* | 9/2013 | Morris | H02M 3/335 363/21.12 |
| 2015/0318789 A1* | 11/2015 | Yang | H02M 3/33523 363/15 |
| 2016/0172962 A1* | 6/2016 | Chen | H02M 3/33592 363/21.14 |

* cited by examiner

*Primary Examiner* — Timothy J Dole
*Assistant Examiner* — Ishrat Jamali (57) ABSTRACT

An electrical circuit for a power supply includes a primary-side controller integrated circuit (IC) that outputs a drive signal on a switch pin to control a switching operation of a switch that is coupled to a primary winding of a transformer. The primary-side controller IC places the switch pin at high impedance during a sense window and turns on the switch in response to sensing a dynamic detection signal on the switch pin during the sense window. The dynamic detection signal is induced by a secondary-side controller IC by controlling switching of a switch that is coupled to a secondary winding of the transformer when the output voltage drops below a predetermined threshold during standby or other low load conditions.

19 Claims, 9 Drawing Sheets

POWER SUPPLY CIRCUIT WITH SECONDARY SIDE TO PRIMARY SIDE COMMUNICATION

CROSS-REFERENCE TO RELATED APPLICATION

This application claims the benefit of U.S. Provisional Application No. 62/352,226, filed on Jun. 20, 2016, which is incorporated herein by reference in its entirety.

BACKGROUND OF THE INVENTION

1. Field of the Invention

The present invention relates generally to electrical circuits, and more particularly but not exclusively to power supplies.

2. Description of the Background Art

Primary-side regulation (PSR) refers to controlling an output voltage and current of a power supply by sensing the output voltage on a primary side of the power supply. More particularly, in a power supply with flyback converter topology, an input voltage is coupled to a primary winding of a transformer. A primary-side switch may be driven by a PSR controller to induce current on a secondary winding of the transformer. Current induced on the secondary winding charges an output capacitor to generate the output voltage on a secondary side of the power supply. The PSR controller, which is on the primary side, may sense the output voltage from an auxiliary winding of the transformer, instead of directly from the secondary side. Primary-side regulation has several benefits, including removing output voltage and current sensing losses.

Embodiments of the present invention relate to providing communication between the secondary side and the primary side of a power supply to prevent output voltage undershoot.

SUMMARY

In one embodiment, an electrical circuit for a power supply includes a primary-side controller integrated circuit (IC) that outputs a drive signal on a switch pin to control a switching operation of a switch that is coupled to a primary winding of a transformer. The primary-side controller IC places the switch pin at high impedance during a sense window and turns on the switch in response to sensing a dynamic detection signal on the switch pin during the sense window. The dynamic detection signal may be induced by a secondary-side controller IC by controlling switching of a switch that is coupled to a secondary winding of the transformer when the output voltage drops below a predetermined threshold during standby or other low load conditions.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

For ease of reading, subscripts and superscripts that appear in the drawings are formatted below as normal fonts. For example, a signal that is labeled in the drawings as $V_{EXAMPLE}$ is simply written below as VEXAMPLE.

Figure 1:
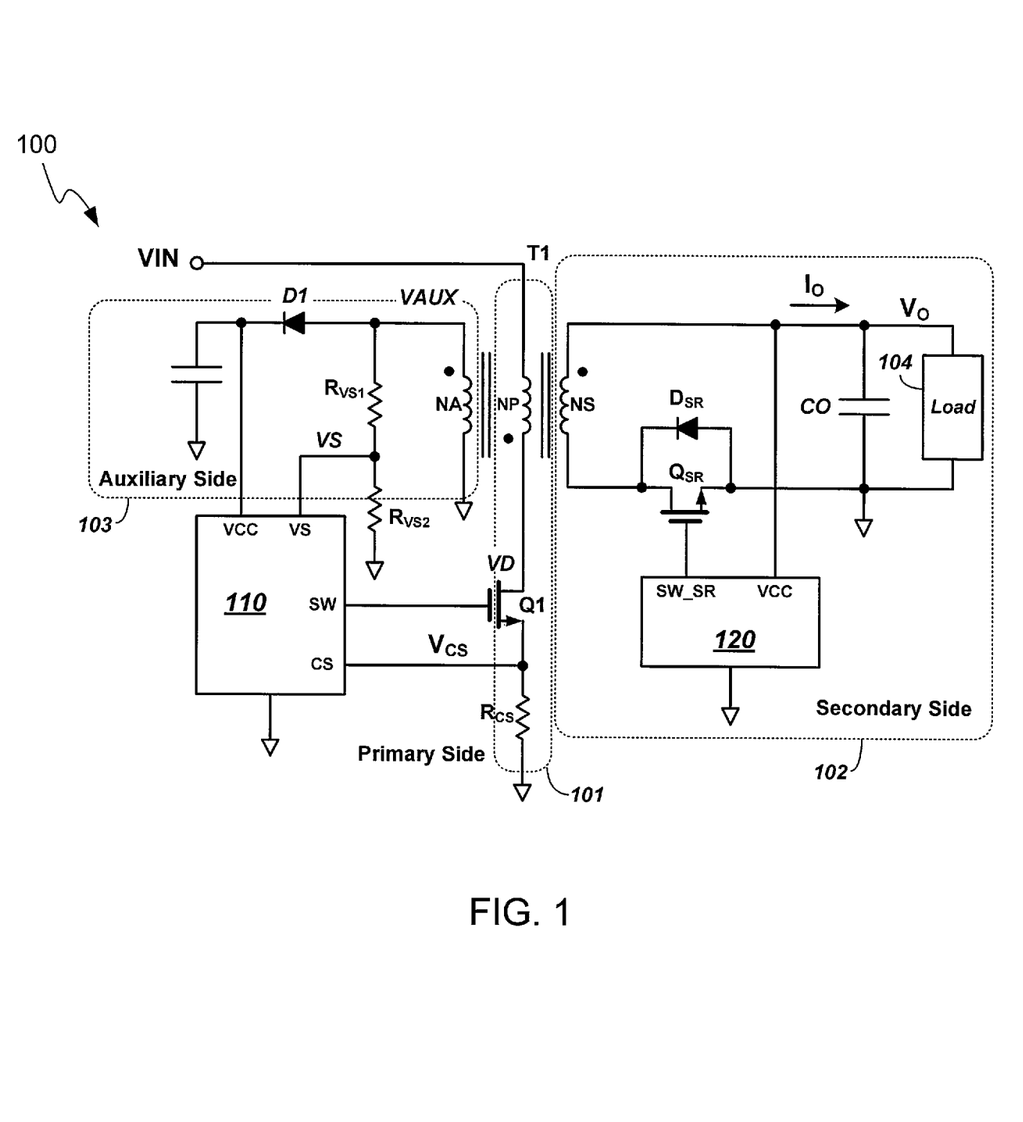
FIG. 1 shows a schematic diagram of a power supply in accordance with an embodiment of the present invention.

FIG. 1 shows a schematic diagram of a power supply 100 in accordance with an embodiment of the present invention. In the example of FIG. 1, the power supply 100 has a flyback converter topology with primary-side regulation (PSR). The power supply 100 comprises a primary-side controller IC 110 and a secondary-side controller IC 120. The secondary-side controller IC 120 may be a charging protocol integrated circuit (IC) or other controller. The primary-side controller IC 110 may provide PSR control and work in conjunction with the secondary-side controller IC 120, e.g., to charge a battery of a device coupled to the output voltage VO on the output capacitor CO. The device, which may be a smartphone, mobile computing device, or other chargeable device, presents a load 104 to the power supply 100. The power supply 100 may be incorporated in a power travel adapter, for example.

In the example of FIG. 1, a flyback transformer T1 has a primary winding NP, an auxiliary winding NA, and a secondary winding NS. The polarities of the windings of the transformer T1 are depicted in accordance with the dot convention. More particularly, the secondary winding NS and the auxiliary winding NA have the same polarity, and the primary winding NP has a polarity opposite to those of the secondary winding NS and the auxiliary winding NA. The power supply 100 has components on the primary side (FIG. 1, 101), secondary side (FIG. 1, 102), and auxiliary side (FIG. 1, 103). The primary-side controller IC 110 is on the primary side of the power supply 100 and the secondary-side controller IC 120 is on the secondary side of the power supply 100. It is to be noted that for purposes of this disclosure, and in most applications, the components on the primary side and auxiliary side are on the primary side of the power supply 100 because they share the same ground reference.

The power supply 100 receives an input voltage VIN at the primary winding NP. The input voltage VIN may be a direct current (DC) voltage. In one embodiment, a primary-side switch Q1 may be a metal oxide semiconductor (MOS) transistor, for example. In the example of FIG. 1, the primary-side switch Q1 has a drain that is connected to the primary winding NP and a source that is connected to ground by way of a current sense resistor RCS. Turning on the primary-side switch Q1 couples the input voltage VIN to ground, thereby flowing a primary winding current through the primary-side switch Q1 to the sense resistor RCS to develop a current sense voltage VCS that is indicative of the primary winding current.

Turning on the primary-side switch Q1 increases the primary winding current and magnetic flux, stores energy in the transformer T1, and the input voltage VIN voltage reflects from the primary winding NP to the secondary winding NS by the turns ratio NP/NS. The reflected voltage on the secondary winding NS places a diode rectifier DSR in reverse bias. When the primary-side switch Q1 is turned off, the primary winding current and magnetic flux drop, and the magnetic current in the transformer T1 forward biases the diode rectifier DSR and charges the output capacitor CO to generate a DC output voltage VO, which is delivered to the load 104. For energy efficiency, the secondary-side controller IC 120 turns on a secondary-side switch QSR (e.g., MOS transistor) to provide a low impedance current path when the primary-side switch Q1 is turned off. During the magnetic flux drop period, the output voltage VO reflects from the secondary winding NS to the auxiliary winding NA. With appropriate windings turns-ratio, the auxiliary voltage VAUX on the auxiliary winding NA is thus indicative of the output voltage VO.

In the example of FIG. 1, the primary-side controller IC 110 has a plurality of pins, including a supply voltage VCC pin, a voltage sense VS pin, a switch SW pin, and a current sense CS pin. The primary-side controller IC 110 receives the auxiliary voltage VAUX on the VCC pin through a diode D1. An internal regulator receives the voltage on the VCC pin to generate a supply voltage for powering the primary-side controller IC 110. A resistor divider comprising resistors RVS1 and RVS2 scales the auxiliary voltage VAUX to generate the sense voltage VS that is indicative of the output voltage. The primary-side controller IC 110 may sample the sense voltage VS to sense the output voltage VO.

The primary-side controller IC 110 may control a switching operation of the primary-side switch Q1 to maintain the output voltage VO by PSR. The primary-side controller IC 110 may generate a drive signal at the SW pin to drive the gate of the primary-side switch Q1 by, for example, pulse width modulation (PWM) based on the sense voltage VS received on the VS pin and based on the current sense voltage VCS received on the CS pin.

In the example of FIG. 1, the secondary-side controller IC 120 includes an SW_SR pin for outputting a gate drive signal to the secondary-side switch QSR and a VCC pin for receiving a voltage that is used by an internal regulator to generate a supply voltage for powering the secondary-side controller IC 120.

Figure 2:
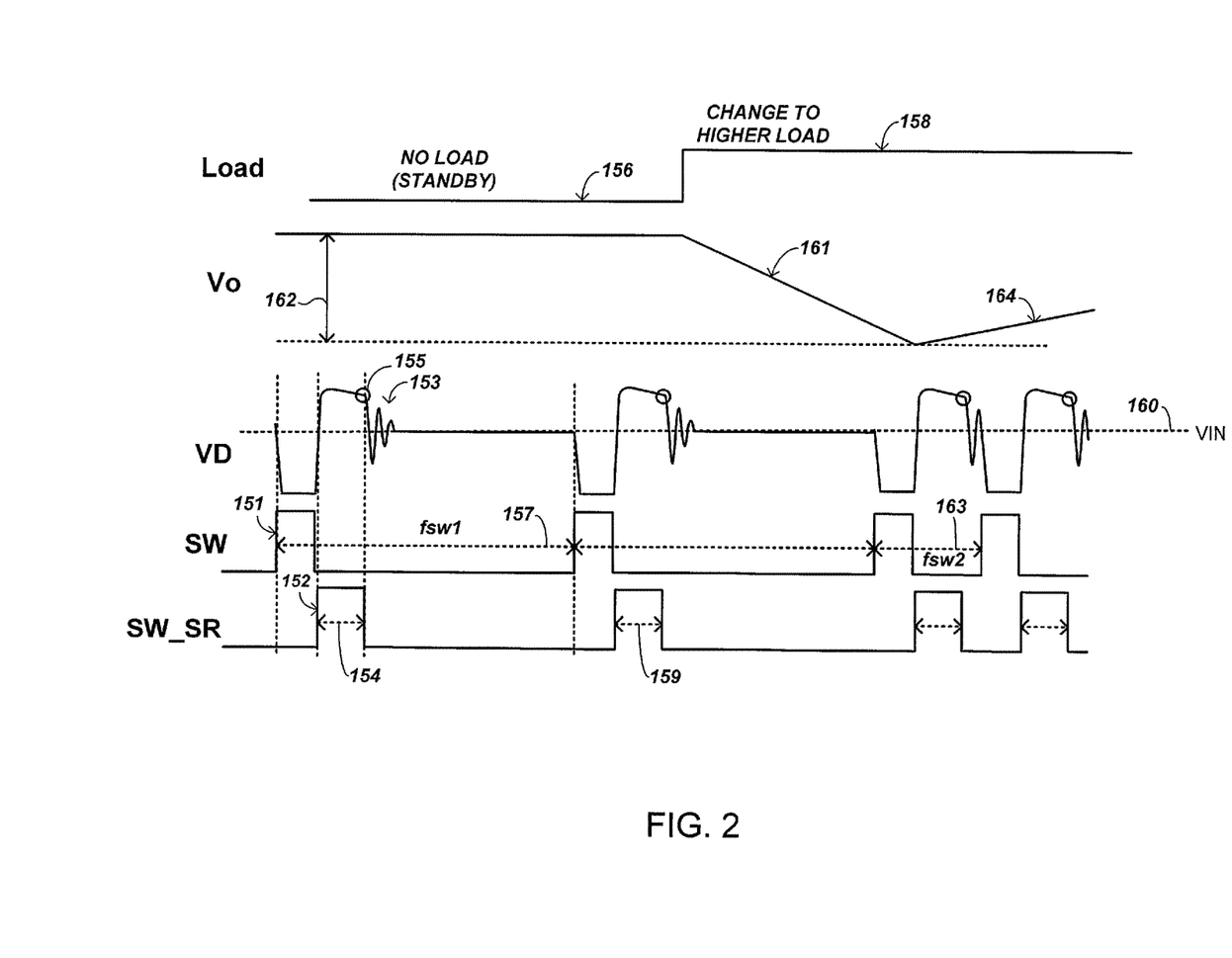
FIG. 2 shows example waveforms of signals of the power supply of FIG. 1 without secondary side to primary side communication.

As will be more apparent below, the power supply 100 includes secondary side to primary side communication in standby mode (e.g., low or no load condition). For comparison purposes, FIG. 2 shows example waveforms of signals of the power supply 100 without the aforementioned secondary side to primary side communication feature. FIG. 2 shows, from top to bottom, the load condition, the output voltage VO, the drain voltage VD on the drain of the primary-side switch Q1, the gate drive signal at the SW pin of the primary-side controller IC 110, and the gate drive signal at the SW_SR pin of the secondary-side controller IC 120 without secondary side to primary side communication.

Referring to FIG. 2, to regulate the output voltage VO, the primary-side controller IC 110 relies on sampling the sense voltage VS, which is indicative of the output voltage VO. When the primary-side switch Q1 is turned on (FIG. 2, 151), the drain voltage VD decreases to a value below the input voltage VIN (FIG. 2, 160). When the primary-side switch Q1 is turned off, the secondary-side switch QSR is turned on (FIG. 2, 152), and the drain voltage VD increases above the input voltage VIN. When magnetic flux is totally released, the drain voltage VD starts resonating (FIG. 2, 153). Without secondary side to primary side communication, the primary-side controller IC 110 will sample the sense voltage VS only during a narrow sampling window (FIG. 2, 154) and very close to end of the sampling window before the drain voltage VD starts to resonate (FIG. 2, 155).

The sampling of the sense voltage VS is dependent on the switching frequency of the primary-side controller IC 110. To regulate the output voltage in standby mode (FIG. 2, 156; no load condition), the switching frequency (FIG. 2, 157) of the primary-side switch Q1 becomes very slow (less than 1 KHz, e.g., about 300 Hz) to maintain input/output energy balance, resulting in the sampled sense voltage VS getting refreshed less frequently. When the load changes to a higher value (FIG. 2, 158) after the sense voltage VS sampling window (FIG. 2, 159), the output voltage VO will drop (FIG. 2, 161) but the primary-side controller IC 110 will not detect the output voltage change until the next switching cycle, thereby causing a large output voltage undershoot (FIG. 2, 162). The switching frequency of the primary-side switch Q1 becomes faster at higher load (FIG. 2, 163), thereby getting more samples of the sense voltage VS, to increase the output voltage (FIG. 2, 164). However, the output voltage undershoot is not acceptable in some applications.

Figure 3:
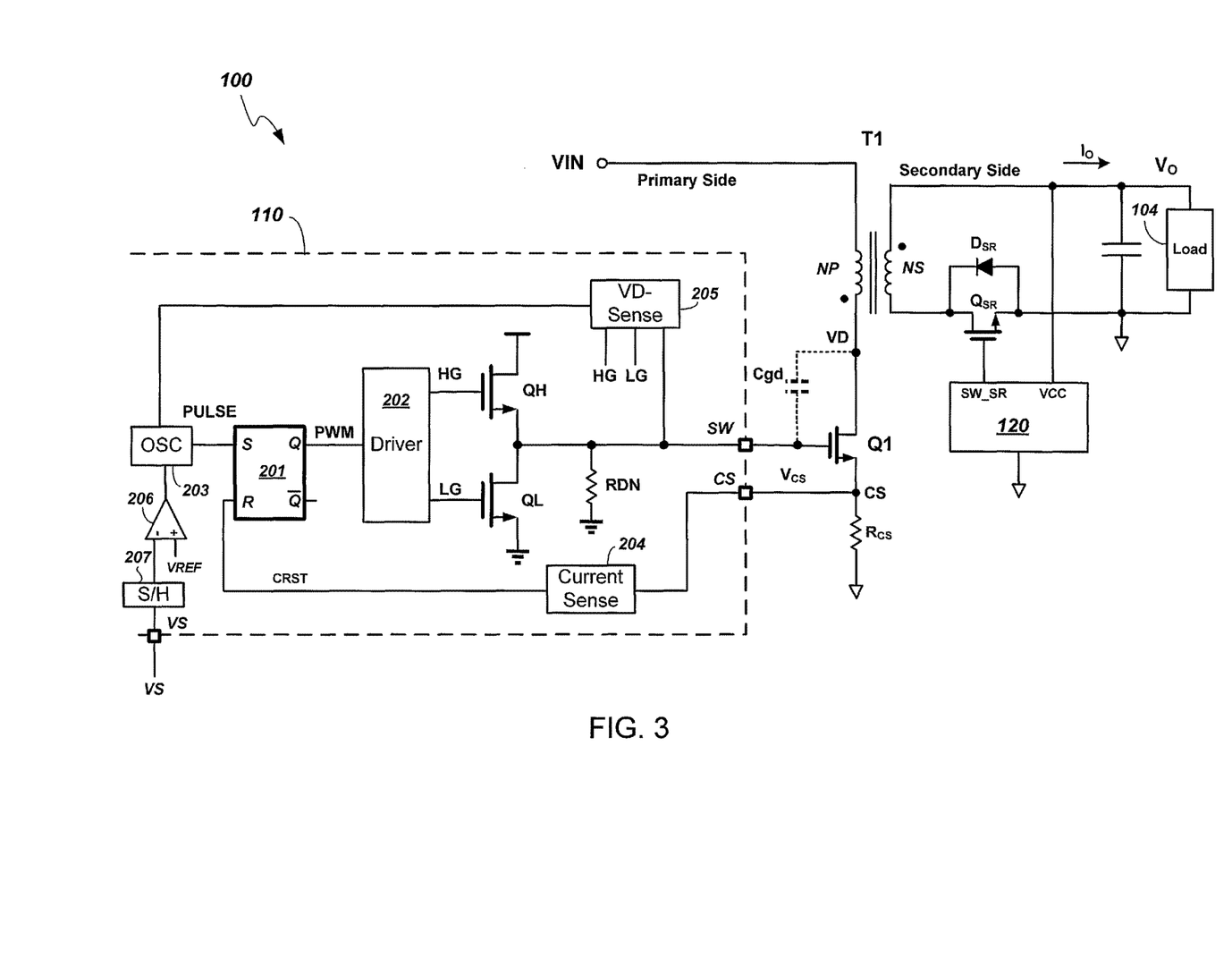
FIG. 3 shows additional details of the power supply of FIG. 1 in accordance with an embodiment of the present invention.

FIG. 3 shows additional details of the power supply 100 in accordance with an embodiment of the present invention. In one embodiment, the power supply 100 operates as in the waveforms of FIG. 2 except with secondary side to primary side communication. In response to sensing a dynamic detection signal sent from the secondary side during standby mode, the primary-side switch Q1 is turned on to allow sampling of the sense voltage VS and resume normal operation with minimum or no output voltage undershoot.

More particularly, the power supply 100 includes a provision for the dynamic detection signal to be communicated from the secondary winding NS to the primary winding NP during standby mode to alert the primary-side controller IC 110 of a load condition change. In one embodiment, the dynamic detection signal is a resonant signal that is induced by the secondary-side controller IC 120 from the secondary side of the power supply. In response to detecting the resonant signal, the primary-side controller IC 110 turns on the primary-side switch Q1, thereby allowing sampling of the sense voltage VS. Components and pins relating to the auxiliary side 103 (see FIG. 1), such as the auxiliary winding NA and sampling of the sense voltage VS, are not shown in FIG. 3 for clarity of illustration. The components and operation of the power supply 100 as depicted in FIG. 3 are otherwise the same as previously explained with reference to FIG. 1.

In the example of FIG. 3, the primary-side controller IC 110 includes a flip-flop 201, a driver circuit 202, an oscillator 203, a current sense circuit 204, and a drain voltage VD sense circuit 205. Components of the primary-side controller IC 110 that are not necessary to the understanding of the invention are not shown for clarity of illustration.

In the example of FIG. 3, the flip-flop 201 generates a PWM signal based on the PULSE signal generated by the oscillator 203 and a reset CRST signal generated by the current sense circuit 204. The PULSE signal may be a clock signal. When the PULSE signal is asserted, the flip-flop 201 is set to assert the PWM signal. In response to the PWM signal being asserted, the driver circuit 202 turns on a high-side switch QH (e.g., MOS transistor) by asserting an HG signal, and turns off a low-side switch QL (e.g., MOS transistor) by de-asserting an LG signal.

In the example of FIG. 3, a sample and hold circuit 207 samples and holds the sense voltage VS that is received at the VS pin The sampled sense voltage VS is provided to an amplifier 206, which compares the sampled sense voltage VS to a reference voltage VREF. The output of the amplifier 206 is connected to the oscillator 203, which controls the on-time of the PWM signal by generating the PULSE signal based on the comparison of the sampled sense voltage VS to the reference voltage VREF in accordance with PWM control.

In one embodiment, the current sense circuit 204 is configured to sense the current sense voltage VCS at the CS pin, and assert the CRST signal when the current sense voltage VCS exceeds a current threshold. Asserting the CRST signal resets the flip-flop 201, thereby de-asserting the PWM signal. When the PWM signal is not asserted, the driver circuit 202 is configured to assert the LG signal to turn on the low-side switch QL for a predetermined period of time T1 and then de-assert the LG signal to turn off the low-side switch QL after expiration of the predetermined period of time T1. Accordingly, there is a period when both the high-side switch QH and the low-side switch QL are turned off. When both the high-side switch QH and the low-side switch QL are turned off, a resistor RDN (e.g., 100 kilo-ohms to 200 kilo-ohms) presents a high impedance on the SW pin.

In one embodiment, the sense circuit 205 is configured to sense for a resonant signal that is being used as the dynamic detection signal when both the high-side switch QH and the low-side switch QL are turned off. More particularly, the sense circuit 205 receives the HG and LG signals, monitors the SW pin for the resonant signal when both the HG and LG signals are de-asserted, and triggers the oscillator 203 to assert the PULSE signal in response to detecting the resonant signal. During standby mode, the secondary-side controller IC 120 may detect the lowering of the output voltage VO. In response thereto, the secondary-side controller IC 120 may switch the secondary-side switch QSR to generate the resonant signal on the secondary winding NS, which is induced on the primary winding NP and received by the sense circuit 205 at the SW pin through the parasitic capacitance CGD across the drain and the gate of the primary-side switch Q1.

Figure 4:
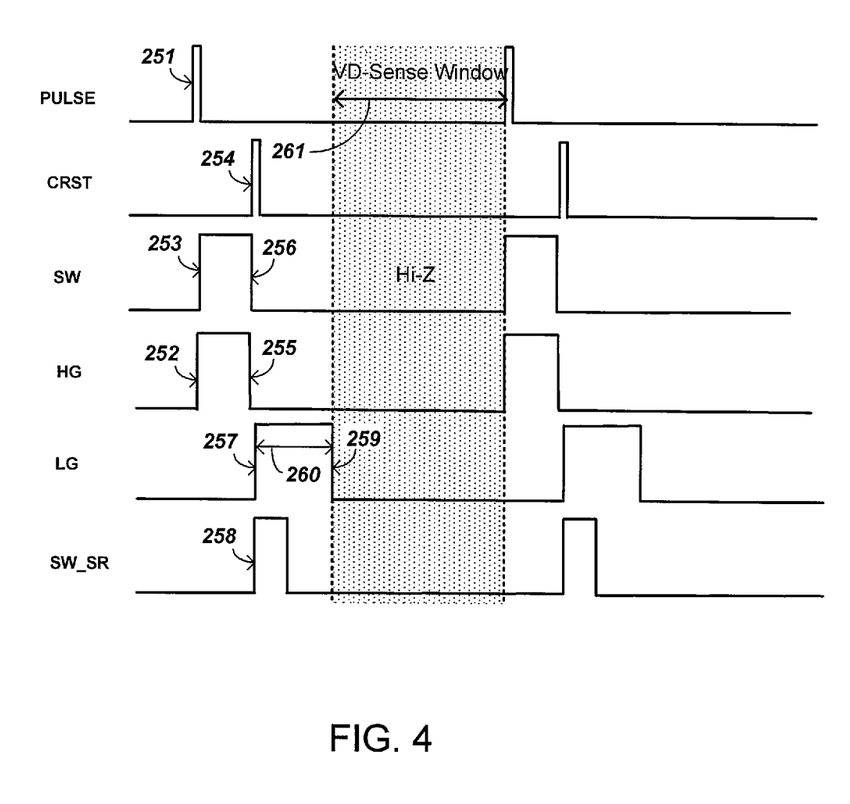
FIGS. 4-8 show example waveforms of signals of a power supply in accordance with an embodiment of the present invention.

FIG. 4 shows example waveforms of signals of the power supply 100 of FIG. 3 in accordance with an embodiment of the present invention. FIG. 4 shows, from top to bottom, the PULSE signal generated by the oscillator 203, the CRST signal generated by the current sense circuit 204, the gate drive signal at the SW pin of the primary-side controller 110, the HG signal generated by the driver circuit 202, the LG signal generated by the driver circuit 202, and the gate drive signal at the SW_SR pin of the secondary-side controller 120.

When the PULSE signal is asserted (FIG. 4, 251), the HG signal is asserted (FIG. 4, 252) to turn on the primary-side switch Q1 (FIG. 4, 253). When the CRST signal is asserted (FIG. 4, 254), the HG signal is de-asserted (FIG. 4, 255) to turn off the primary-side switch Q1 (FIG. 4, 256), and the LG signal is asserted (FIG. 4, 257). The secondary-side switch QSR is turned on shortly after the primary-side switch Q1 is turned off (FIG. 4, 258). The LG signal is de-asserted (FIG. 4, 259) after the LG signal has been asserted for a predetermined period of time (FIG. 4, 260). Therefore, there is a drain voltage VD sense window (FIG. 4, 261) during which both the HG signal and the LG signal are de-asserted. In one embodiment, the SW pin of the primary-side controller IC 110 is placed at high impedance (Hi-Z) during the drain voltage VD sense window to allow for reception and sensing of the resonant signal induced from the secondary-side.

Generally speaking, the primary-side controller IC 110 provides for a drain voltage VD sense time window during which the SW pin of the primary-side controller IC 110 is placed at high impedance (Hi-Z). When the secondary-side controller IC 120 detects a drop in the output voltage VO, the secondary-side controller IC 120 turns on the secondary-side switch QSR for a short time, thereby causing the drain voltage VD on the drain of the primary-side switch Q1 to resonate. If the drain voltage VD is resonant during the period where the SW pin is at high impedance, the primary-side controller IC 110 will detect the resonant drain voltage VD and respond to pulse width modulation (PWM) logic to turn ON the primary-side switch Q1 to prevent the output voltage VO from dropping too low.

Figure 5:
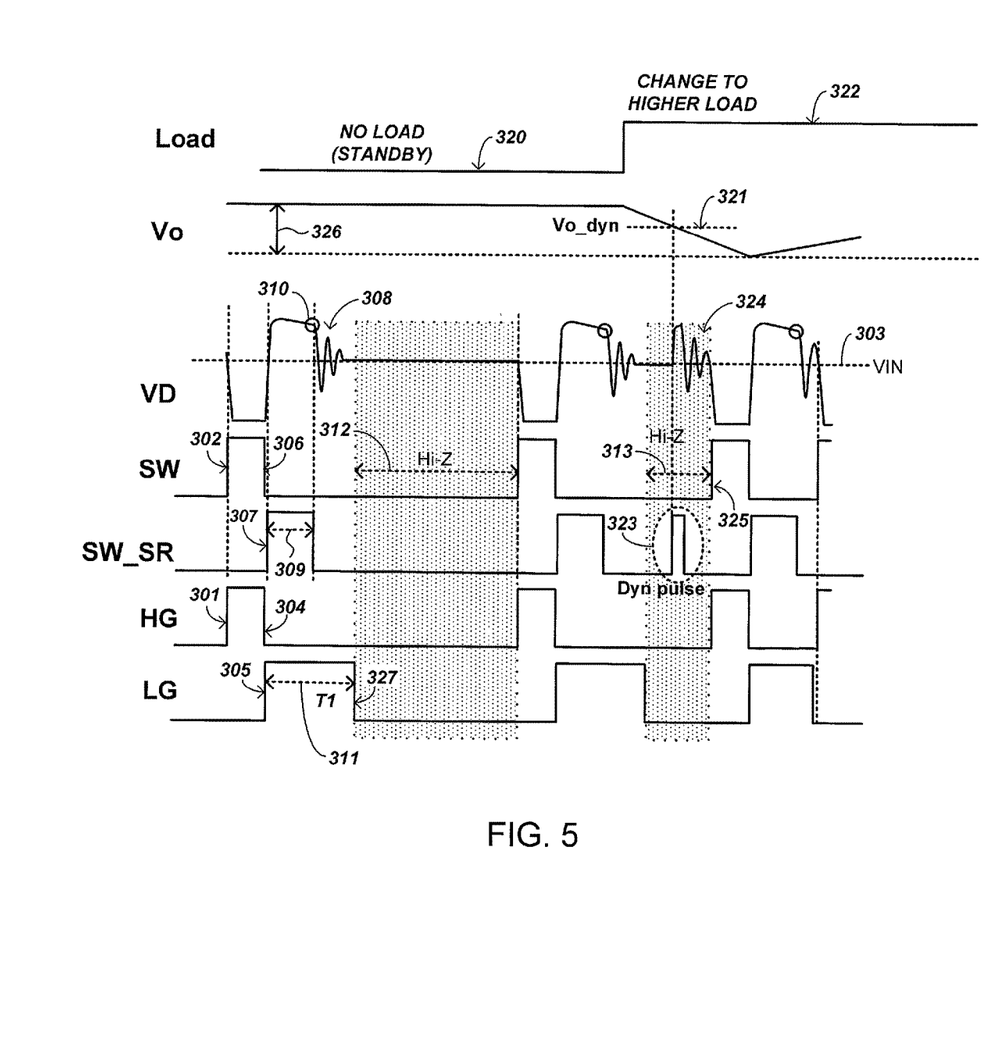

FIG. 5 shows example waveforms of signals of the power supply 100 in accordance with an embodiment of the present invention. FIG. 5 shows, from top to bottom, the load condition, the output voltage VO, the drain voltage VD on the drain of the primary-side switch Q1, the gate drive signal at the SW pin of the primary-side controller IC 110, the gate drive signal at the SW_SR pin of the secondary-side controller IC 120, the HG signal, and the LG signal.

Referring to 5, when the HG signal is asserted (FIG. 5, 301), the primary-side switch Q1 is turned on (FIG. 5, 302) and the drain voltage VD decreases to a value below the input voltage VIN (FIG. 5, 303). The HG signal is de-asserted (FIG. 5, 304) and the LG signal is asserted (FIG. 5, 305) to turn off the primary-side switch Q1 (FIG. 5, 306). When the primary-side switch Q1 is turned off, the secondary-side switch QSR is turned on (FIG. 5, 307), and the drain voltage VD increases above the input voltage VIN and starts resonating (FIG. 5, 308). The primary-side controller IC 110 samples the sense voltage VS during a sampling window (FIG. 5, 309) and very close to end of the sampling window before the drain voltage VD starts to resonate (FIG. 5, 310). In the example of FIG. 5, the sampling window for sampling the sense voltage VS is the pulse width of the gate drive signal to the secondary-side switch QSR.

As previously noted, the driver circuit 202 is configured such that the LG signal goes high for a time T1 (FIG. 5, 311) then goes low at the expiration of the time T1 (FIG. 5, 327). Accordingly, there is a period when the LG signal and the HG signal are both off, so that the SW pin is at high impedance (FIG. 5, 312; 313) with an initial voltage at 0V. At very light load or standby mode (FIG. 5, 320), the primary-side switch Q1 switching frequency is slow. In one embodiment, the sense circuit 205 includes a circuit for limiting the SW pin voltage when it is at high impedance to prevent inadvertently turning on the primary-side switch Q1. At heavy load when the HG signal pulse interval is less than T1, the LG signal is configured to go low before the HG signal goes high so that the switches QH and QL will not turn on at the same time. In one embodiment, the drain voltage VD sensing for secondary side to primary side communication may be enabled only in light load conditions or standby mode.

In one embodiment, the secondary-side controller IC 120 is configured to sense the output voltage VO from the VCC pin. During no or low load condition, when the secondary-side controller IC 120 detects that the output voltage VO drops below a predetermined threshold voltage VO_DYN (FIG. 5, 321), indicating a change to a higher load (FIG. 5, 322), the secondary-side controller IC 120 turns on the secondary-side switch QSR with a dynamic detection pulse signal DYN_PULSE (FIG. 5, 323) so that the gate drive signal at the SW_SR pin rises slowly to control the output current IO and to limit the primary winding current, which may be enhanced by also controlling the amplitude of the gate drive signal at the SW_SR pin. In response, the drain voltage VD on the drain of the primary-side switch Q1 will resonate (FIG. 5, 324). The resonant drain voltage VD will be coupled to the SW pin of the primary-side controller IC 110 during its high impedance period (FIG. 5, 313). The primary-side controller IC 110 will sense the resonance at the SW pin and turn on the primary-side switch Q1 in response (FIG. 5, 325) to sample the sense voltage VS and resume switching with minimum output voltage undershoot (FIG. 5, 326).

Figure 6:
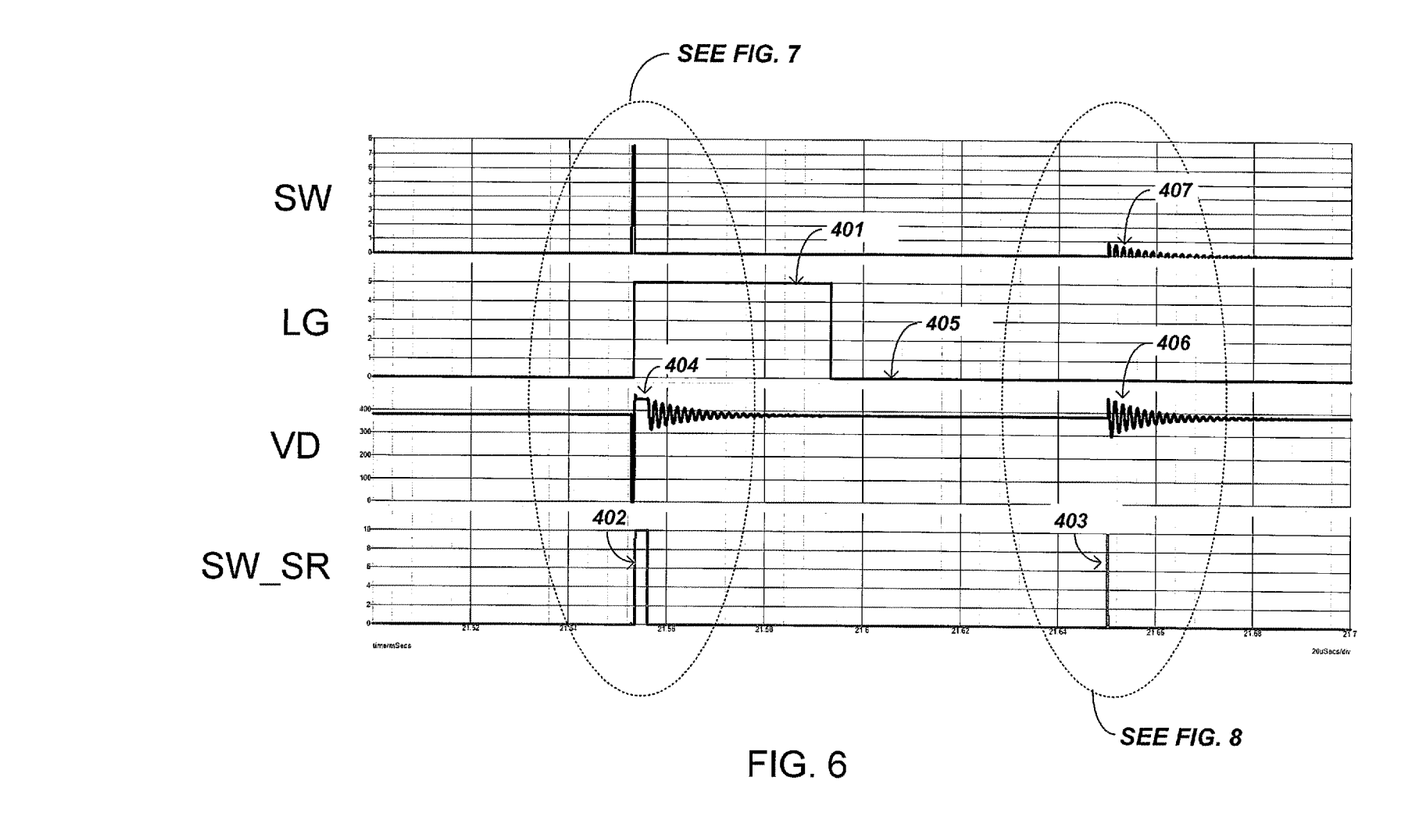

FIG. 6 shows example waveforms of signals of the power supply 100 of FIG. 3 in accordance with an embodiment of the present invention. FIG. 6 shows, from top to bottom, the gate drive signal at the SW pin of the primary-side controller IC 110, the LG signal that drives the gate of the low-side switch QL, the drain voltage VD on the drain of the primary-side switch Q1, and the gate drive signal at the SW_SR pin of the secondary-side controller 120. As noted in FIG. 6, enlarged portions of FIG. 6 are shown in FIG. 7 (left hand portion of FIG. 6) and FIG. 8 (right hand portion of FIG. 6).

Figure 7:
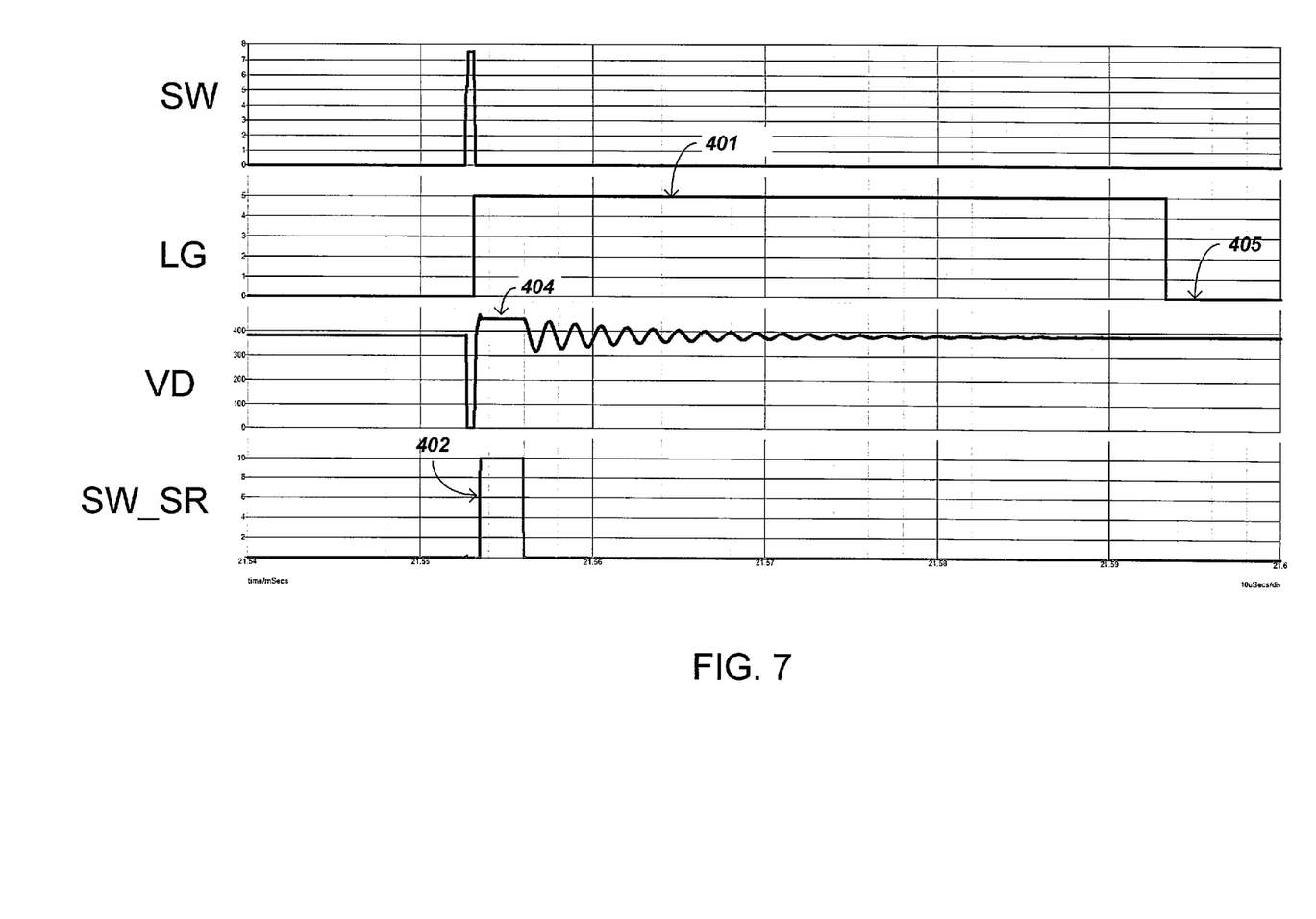
Figure 8:
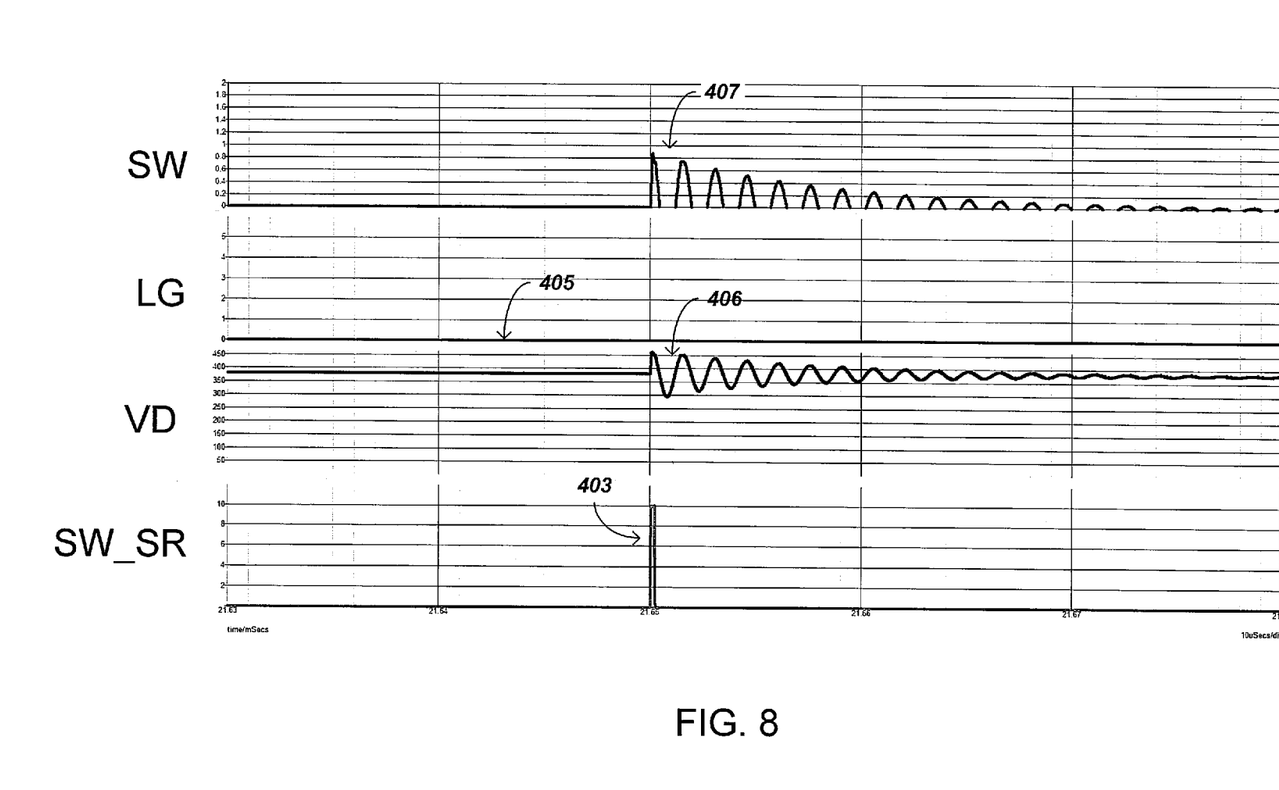

Referring to FIGS. 6-8, in one embodiment, the LG signal is the gate drive signal for pulling down the SW pin. In one embodiment, the SW pin is pulled down when the LG signal is asserted (FIGS. 6 and 7, 401). The first pulse at the SW_SR pin (FIGS. 6 and 7, 402) is due to the normal switching cycle as controlled by the secondary-side controller IC 120. The second pulse at the SW_SR pin (FIGS. 6 and 8, 403) is a dynamic detection signal that is generated when the secondary-side controller IC 120 detects that the output voltage VO drops below the threshold voltage VO_DYN (see FIG. 5, 321). Because the LG signal pulls down the SW pin during the first pulse at the SW_SR pin, no resonant ringing appears at the SW pin (FIGS. 6 and 7, 404) for the first pulse. After the LG signal is de-asserted (FIGS. 6-8, 405), one short pulse at the SW_SR pin (FIGS. 6 and 8, 403) can induce the resonant drain voltage VD (FIGS. 6 and 8, 406), which is also coupled to the SW pin (FIGS. 6 and 8, 407) of the primary-side controller IC 110 and can be used to sense the dynamic detection pulse generated at the SW_SR pin of the secondary-side controller IC 120.

Generally speaking, in the power supply 100, secondary side to primary side communication in standby mode is through the secondary winding NS and primary winding NP of the flyback transformer T1. In one embodiment, the dynamic detection signal is a resonant signal that is is induced on the primary winding NP by the secondary-side controller IC 120 and coupled to the SW pin of the primary-side controller IC 110 through the parasitic capacitance CGD of the primary-side switch Q1. The primary-side controller IC 110 responds to the resonant signal by generating a control signal to turn ON the primary-side switch Q1. In standby mode, the primary-side controller IC 110 enables a drain voltage VD sense window where the SW pin is at high impedance. When the secondary-side controller IC 120 detects that the output voltage drops below a predetermined threshold VO_DYN, (a) the secondary-side controller IC 120 will slowly turn ON the secondary-side switch QSR with SW_SR pin rise time control and logic-high amplitude control to limit current, (b) the drain voltage VD will resonate in response to the turning on of the secondary-side switch QSR, (c) the resonant drain voltage VD will be coupled to the SW pin (which is at high impedance) of the primary-side controller IC 110, and (d) the primary-side controller IC 110 will sense the resonant drain voltage at the SW pin and turn on the primary-side switch Q1 in response.

In the power supply 100, the dynamic detection signal is detected at the gate of the primary-side switch Q1 by way of the parasitic capacitance between the drain and the gate. However, this is not necessarily the case. For example, the dynamic detection signal may also be detected at the source of a switch on the primary side of the power supply, as now described with reference to FIG. 9.

Figure 9:
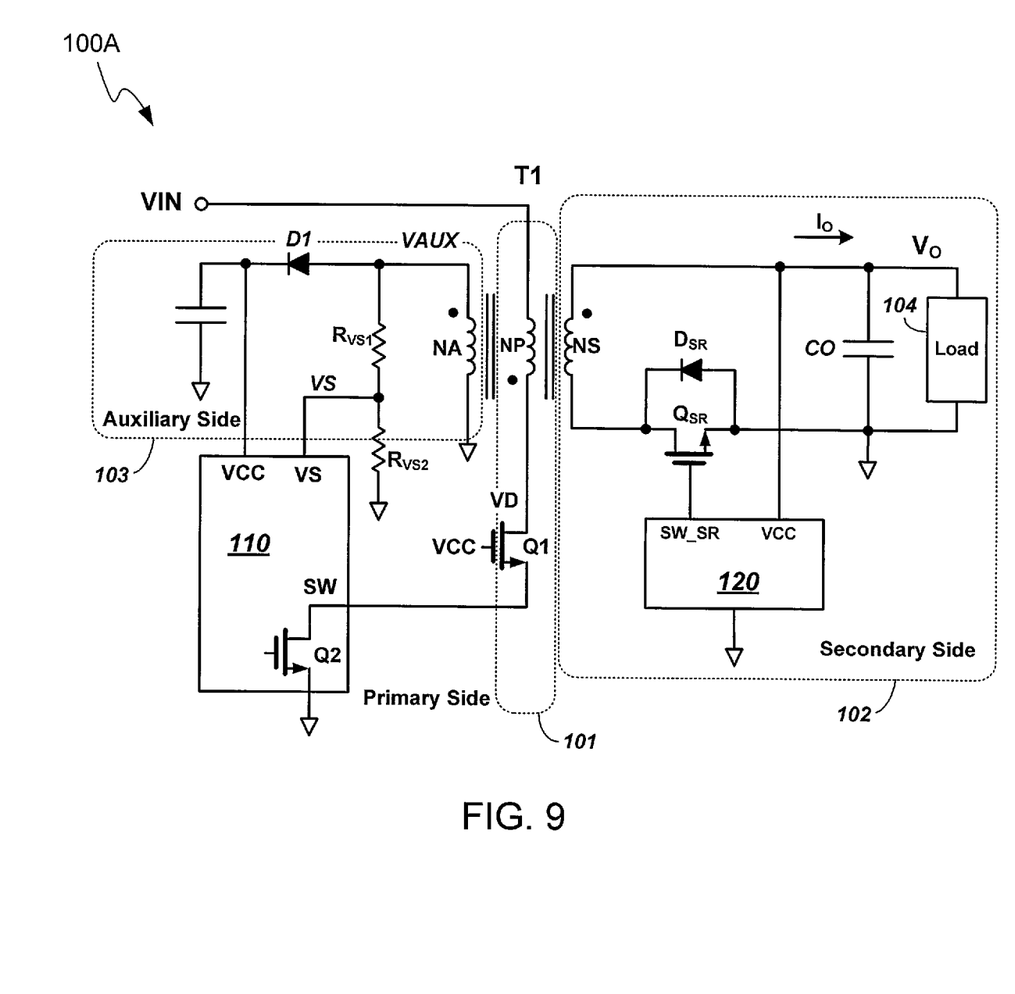
FIG. 9 shows a schematic diagram of a power supply in accordance with an embodiment of the present invention.

FIG. 9 shows a schematic diagram of a power supply 100A in accordance with an embodiment of the present invention. The power supply 100A is a particular implementation of the power supply 100 where the dynamic detection signal for secondary side to primary side communication in standby mode is detected at the source of a MOS transistor on the primary side of the power supply.

In the example of FIG. 9, the power supply 100A operates similarly to the power supply 100 except that it detects the dynamic detection signal at the source of the primary-side switch Q1. Generally speaking, moving the detection from the gate to the source of the primary-side switch Q1 allows for easier implementation, but adds an auxiliary switch Q2 that is connected to the source of the primary-side switch Q1 on the primary side of the power supply 100A.

In the example of FIG. 9, the gate of the primary-side switch Q1 is connected to a supply voltage VCC. A drain of the auxiliary switch Q2 is connected to the source of the primary-side switch Q1 and the source of the auxiliary switch Q2 is connected to ground. The gate-to-source voltage VGS of the primary-side switch Q1, and thus its conduction state, may thus be controlled by controlling the auxiliary switch Q2. In the example of FIG. 9, the auxiliary switch Q2 is internal to the primary-side controller IC 110 and is controlled by the primary-side controller IC 110 to control switching of the primary-side switch Q1 to regulate the output voltage VO. That is, the gate drive signal for regulating the output voltage VO is coupled internally to the gate of the auxiliary switch Q2. Sensing of the primary winding current is not shown in FIG. 9 for clarity of illustration, but may be accomplished by adding a sense resistor on the source of the auxiliary switch Q2 or other sense circuit. When the auxiliary switch Q2 is off, the SW pin of the primary-side controller IC 110 will be at high impedance, allowing for detection of the resonant signal at the SW pin.

More particularly, in the power supply 100A, when the secondary-side controller IC 120 detects that the output voltage VO drops below the predetermined threshold VO_DYN, the secondary-side controller IC 120 will turn on the secondary-side switch QSR as previously explained so that the drain voltage VD of the primary-side switch Q1 will resonate in response. The resonant drain voltage VD will be coupled to the pin SW through the source of the primary-side switch Q1 while the pin SW is at high impedance. The controller IC 110 will sense the resonance at the pin SW and, in response, will turn on the auxiliary switch Q2 to sample the sense voltage VS.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An electrical circuit for a power supply, the electrical circuit comprising:
   a primary-side switch on a primary side of the power supply, the primary-side switch being connected to a primary winding of a flyback transformer;
   a secondary-side controller integrated circuit (IC) that is configured to monitor an output voltage on a secondary side of the power supply and to induce a detection signal from a secondary winding of the flyback transformer to the primary winding of the flyback transformer in response to the output voltage of the power supply dropping below a threshold; and
   a primary-side controller IC comprising:
      a first pin that is connected to the primary-side switch;
      the primary-side controller IC configured to control a switching operation of the primary-side switch to regulate the output voltage of the power supply, and to turn on the primary-side switch in response to sensing the detection signal at the first pin;
      a high-side switch and a low-side switch that are configured to drive a gate of the primary-side switch through the first pin, wherein the first pin is at high impedance when the high-side switch and the low-side switch are both off, and the primary-side controller IC senses the detection signal while the first pin is at high impedance.

2. The electrical circuit of claim 1, wherein the detection signal is a resonant signal that is induced by the secondary-side controller IC by turning on a secondary-side switch on the secondary side of the power supply.

3. The electrical circuit of claim 2, wherein the first pin is connected to a gate of the primary-side switch, and the resonant signal is detected by the primary-side controller IC from the gate of the primary-side switch while the first pin is at high impedance.

4. The electrical circuit of claim 3, wherein the resonant signal is detected at the first pin through a parasitic capacitance between a drain and the gate of the primary-side switch.

5. The electrical circuit of claim 1, wherein the flyback transformer further comprises
   an auxiliary winding, and the primary-side controller IC samples a sense voltage from the auxiliary winding to sense the output voltage of the power supply.

6. The electrical circuit of claim 1, wherein the primary-side switch is internal to the primary-side controller IC.

7. The electrical circuit of claim 1, further comprising:
   an auxiliary switch that is connected to a source of the primary-side switch, wherein the source of the primary-side switch is connected to the first pin.

8. The electrical circuit of claim 1, wherein a gate of the primary-side switch is connected to the first pin.

9. The electrical circuit of claim 1 wherein the primary-side controller IC further comprises:
   an oscillator that has a trigger input and a pulse output;
   a SR flip-flop that has a Set input, a Reset input, and a SR output, the Set input coupled to the pulse output of the oscillator;
   a driver circuit that has a drive input, a high-gate output, and a low-gate output, the drive input coupled to the SR output, the high-gate output coupled to a gate of the high-side switch, and a low-gate output coupled to the gate of the low-side switch;
   a voltage sense circuit that has a sense input, a high-gate input, a low-gate input, and a trigger output, the sense input coupled to the first pin, the high-gate input coupled to the high-gate output of the driver circuit, the low-gate input coupled to the low-gate output of the driver circuit, and the trigger output coupled to the oscillator;
   and wherein when the primary-side controller IC senses the detection signal, the voltage sense circuit is configured to assert the sense output to the oscillator when the high-gate input and low-gate input are both de-asserted and a detection signal is detected on the sense input; and
   the oscillator configured to assert the pulse output responsive to assertion of the trigger input.

10. An electrical circuit for a power supply, the electrical circuit comprising:
    a primary-side controller integrated circuit (IC) that is configured to receive a sense voltage that is indicative of an output voltage of the power supply, to control a switching operation of a first switch on a primary side of the power supply, to regulate the output voltage of the power supply, to sample the sense voltage after the first switch is turned off, to place a switch pin at high impedance, and to turn on the first switch in response to detecting a dynamic detection signal on the switch pin while the switch pin is at high impedance,
    wherein the dynamic detection signal is induced from a secondary side of the power supply;
    the primary-side controller IC comprises:
       a high-side switch and a low-side switch that are coupled to the switch pin; and
       a driver circuit that is configured to turn on the high-side switch to turn on the first switch, to turn on the low-side switch to pull down the switch pin, and to turn off the high-side switch and the low-side switch to place the switch pin at high impedance.

11. The electrical circuit of claim 10, further comprising:
    a secondary-side controller IC that is configured to control a second switch that is on the secondary side of the power supply.

12. The electrical circuit of claim 11, wherein the secondary-side controller IC controls the second switch to induce the dynamic detection signal when an output voltage of the power supply drops below a threshold.

13. The electrical circuit of claim 10, wherein the first switch comprises a metal-oxide semiconductor (MOS) transistor and the dynamic detection signal is a resonant drain voltage of the MOS transistor.

14. The electrical circuit of claim 10, wherein the first switch comprises a metal-oxide semiconductor (MOS) transistor and the dynamic detection signal is a resonant source voltage of the MOS transistor.

15. The electrical circuit of claim 10 wherein the primary-side controller IC further comprises:
    an oscillator that has a trigger input and a pulse output;
    a SR flip-flop that has a Set input, a Reset input, and a SR output, the Set input coupled to the pulse output of the oscillator;
    a driver circuit that has a drive input, a high-gate output, and a low-gate output, the drive input coupled to the SR output, the high-gate output coupled to a gate of the high-side switch, and a low-gate output coupled to the gate of the low-side switch;

a voltage sense circuit that has a sense input, a high-gate input, a low-gate input, and a trigger output, the sense input coupled to the first pin, the high-gate input coupled to the high-gate output of the driver circuit, the low-gate input coupled to the low-gate output of the driver circuit, and the trigger output coupled to the oscillator;

and wherein when the primary-side controller IC senses the detection signal, the voltage sense circuit is configured to assert the sense output to the oscillator when the high-gate input and low-gate input are both de-asserted and a detection signal is detected on the sense input; and the oscillator configured to assert the pulse output responsive to assertion of the trigger input.

16. A method of operating an electrical circuit for a power supply, the method comprising:

sampling, from a primary side of the power supply, a sense voltage that is indicative of an output voltage of the power supply;

controlling a switching operation of a primary-side switch on the primary side of the power supply to regulate the output voltage of the power supply based on the sense voltage;

inducing a detection signal from a secondary side of the power supply;

coupling the detection signal from a secondary winding of a flyback transformer to a primary winding of the flyback transformer;

placing a pin of a primary-side controller integrated circuit (IC) at high impedance;

sensing the detection signal at the pin of the primary-side controller IC while the pin is at high impedance, the sensing at the pin through a parasitic capacitance between a drain and a gate of the primary-side switch;

in response to sensing the detection signal, turning on the primary-side switch.

17. The method of claim 16, wherein the detection signal is a resonant signal.

18. The method of claim 17, wherein the resonant signal is induced by turning on a secondary-side switch on the secondary side of the power supply in response to detecting the output voltage of the power supply dropping below a threshold.

19. The method of claim 16, wherein placing a pin of a primary-side controller integrated circuit (IC) at high impedance further comprises:
making a high-side switch, coupled to the gate of the primary-side switch, non-conductive;
making a low-side switch, coupled to the gate of the primary-side switch, non-conductive;

wherein sensing the detection signal at the pin of the primary-side controller IC further comprises:
detecting, by a voltage sense circuit, that both the high-side switch and low-side switch are non-conductive; and
sensing, by the voltage sense circuit, the detection signal on the gate of the primary-side switch;

wherein turning on the primary-side switch further comprises commanding, by the voltage sense circuit, assertion of a pulse signal from an oscillator circuit.

* * * * *